United States Patent
Eun et al.

(10) Patent No.: US 9,836,128 B2
(45) Date of Patent: Dec. 5, 2017

(54) METHOD AND DEVICE FOR PROVIDING INFORMATION REGARDING AN OBJECT

(71) Applicant: Samsung Electronics Co., Ltd., Suwon-si, Gyeonggi-do (KR)

(72) Inventors: Dong-jin Eun, Bucheon-si (KR); Choon-kyoung Moon, Yongin-si (KR); Da-hye Park, Incheon (KR); Sang-il Lee, Seongnam-si (KR); Ka-won Cheon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 14/069,882

(22) Filed: Nov. 1, 2013

(65) Prior Publication Data
US 2014/0125580 A1    May 8, 2014

(30) Foreign Application Priority Data

Nov. 2, 2012 (KR) .................. 10-2012-0123753

(51) Int. Cl.
| | | |
|---|---|---|
| *G06F 3/01* | (2006.01) | |
| *G06F 3/042* | (2006.01) | |
| *G06F 3/033* | (2013.01) | |
| *G06F 3/0354* | (2013.01) | |

(52) U.S. Cl.
CPC .............. *G06F 3/017* (2013.01); *G06F 3/033* (2013.01); *G06F 3/03545* (2013.01); *G06F 3/0425* (2013.01)

(58) Field of Classification Search
None
See application file for complete search history.

(56) References Cited

U.S. PATENT DOCUMENTS

| | | | | |
|---|---|---|---|---|
| 5,511,148 A | * | 4/1996 | Wellner | H04N 1/00381 345/156 |
| 5,732,227 A | * | 3/1998 | Kuzunuki | G06F 3/017 715/775 |
| 6,067,112 A | * | 5/2000 | Wellner | G06F 3/033 348/136 |
| 8,382,295 B1 | * | 2/2013 | Kim | H04N 9/31 348/552 |
| 9,158,389 B1 | * | 10/2015 | Sharma | G06F 3/0304 |
| 9,182,815 B2 | * | 11/2015 | Small | G06F 3/011 |

(Continued)

FOREIGN PATENT DOCUMENTS

| | | |
|---|---|---|
| CN | 102624981 A | 8/2012 |
| EP | 0 840 200 A2 | 5/1998 |

(Continued)

OTHER PUBLICATIONS

European Search Report dated Jul. 26, 2017, issued in the European Application No. 13191040.8.

*Primary Examiner* — Nicholas Lee
*Assistant Examiner* — Benjamin Casarez
(74) *Attorney, Agent, or Firm* — Jefferson IP Law, LLP

(57) ABSTRACT

A method of providing information related to an object is provided. The method includes sensing a gesture related to the object located in a certain area via a first device, obtaining content related to the object according to the sensed gesture, and transmitting the obtained content to a second device that is connected with the first device in a network, wherein the content is output via the second device.

20 Claims, 11 Drawing Sheets

(56) References Cited

U.S. PATENT DOCUMENTS

| | | | |
|---|---|---|---|
| 9,230,171 B2* | 1/2016 | Starner | G06K 9/00671 |
| 9,369,632 B2* | 6/2016 | Short | H04N 7/142 |
| 2003/0082505 A1* | 5/2003 | Frohlich | G06F 3/017 |
| | | | 434/180 |
| 2003/0103238 A1* | 6/2003 | MacLean | H04N 1/3873 |
| | | | 358/1.18 |
| 2005/0047683 A1* | 3/2005 | Pollard | H04N 1/00222 |
| | | | 382/306 |
| 2005/0286743 A1 | 12/2005 | Kurzweil et al. | |
| 2006/0251338 A1* | 11/2006 | Gokturk | G06F 17/30253 |
| | | | 382/305 |
| 2007/0273674 A1 | 11/2007 | Cohen et al. | |
| 2008/0013793 A1* | 1/2008 | Hillis et al. | 382/114 |
| 2008/0104011 A1* | 5/2008 | Shibasaki | G06F 17/30247 |
| 2008/0220752 A1* | 9/2008 | Forstall et al. | 455/415 |
| 2009/0271691 A1* | 10/2009 | Brush et al. | 715/201 |
| 2009/0309846 A1* | 12/2009 | Trachtenberg et al. | 345/173 |
| 2010/0013676 A1* | 1/2010 | Do | G06F 3/0425 |
| | | | 341/20 |
| 2010/0194976 A1* | 8/2010 | Smith et al. | 348/373 |
| 2010/0199232 A1* | 8/2010 | Mistry et al. | 715/863 |
| 2010/0210323 A1 | 8/2010 | Collins et al. | |
| 2010/0259633 A1* | 10/2010 | Kii | 348/222.1 |
| 2010/0299390 A1* | 11/2010 | Alameh et al. | 709/204 |
| 2011/0128288 A1* | 6/2011 | Petrou | G06F 17/30047 |
| | | | 345/428 |
| 2011/0154233 A1* | 6/2011 | Lamarca | G06F 3/0425 |
| | | | 715/764 |
| 2011/0179388 A1 | 7/2011 | Fleizach et al. | |
| 2011/0211073 A1 | 9/2011 | Foster | |
| 2011/0249900 A1* | 10/2011 | Thorn et al. | 382/195 |
| 2011/0283329 A1 | 11/2011 | Davis et al. | |
| 2011/0288964 A1* | 11/2011 | Linder | B25J 9/1689 |
| | | | 705/27.1 |
| 2011/0295829 A1 | 12/2011 | Boncyk et al. | |
| 2012/0042288 A1* | 2/2012 | Liao et al. | 715/863 |
| 2012/0128251 A1* | 5/2012 | Petrou | G06F 17/30253 |
| | | | 382/182 |
| 2012/0144073 A1* | 6/2012 | Smith | G06F 3/0425 |
| | | | 710/33 |
| 2012/0249422 A1* | 10/2012 | Tse et al. | 345/158 |
| 2012/0249443 A1* | 10/2012 | Anderson et al. | 345/173 |
| 2012/0320092 A1* | 12/2012 | Shin et al. | 345/633 |
| 2013/0033484 A1* | 2/2013 | Liao et al. | 345/419 |
| 2013/0044912 A1* | 2/2013 | Kulkarni et al. | 382/103 |
| 2013/0188886 A1* | 7/2013 | Petrou | G06F 3/048 |
| | | | 382/305 |
| 2014/0132567 A1* | 5/2014 | Gomez | G06F 3/017 |
| | | | 345/175 |
| 2014/0139717 A1* | 5/2014 | Short | H04N 7/142 |
| | | | 348/333.1 |
| 2014/0349580 A1 | 11/2014 | Chen | |
| 2014/0361988 A1* | 12/2014 | Katz et al. | 345/156 |
| 2015/0070390 A1* | 3/2015 | Kasahara | G06F 3/01 |
| | | | 345/633 |
| 2015/0154232 A1* | 6/2015 | Ovsjanikov | G06F 17/30247 |
| | | | 707/780 |
| 2016/0070809 A1* | 3/2016 | Rathus | G06F 17/30864 |
| | | | 705/7.29 |

FOREIGN PATENT DOCUMENTS

| | | | | |
|---|---|---|---|---|
| GB | 2 381 687 A | | 5/2003 | |
| KR | 1020120090866 A | | 8/2012 | |
| NL | EP 1662362 A1 * | | 5/2006 | G06F 3/017 |

* cited by examiner

FIG. 4A
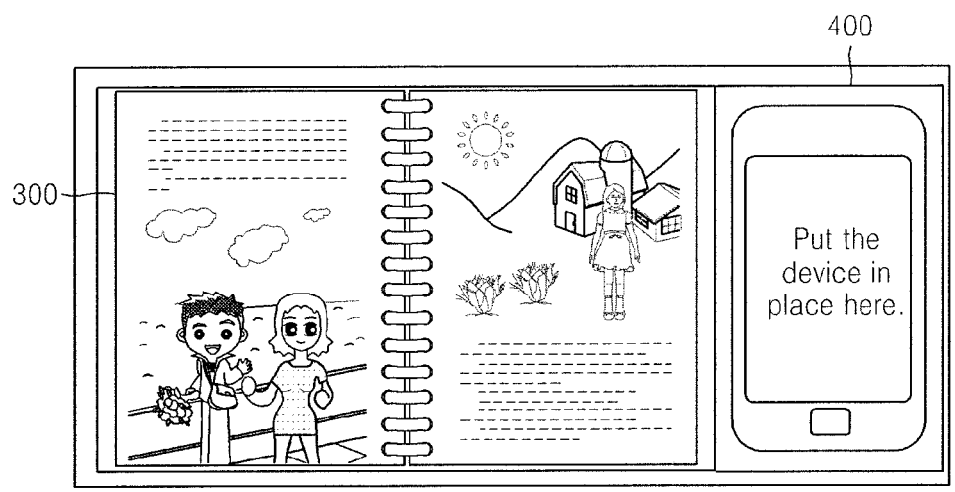
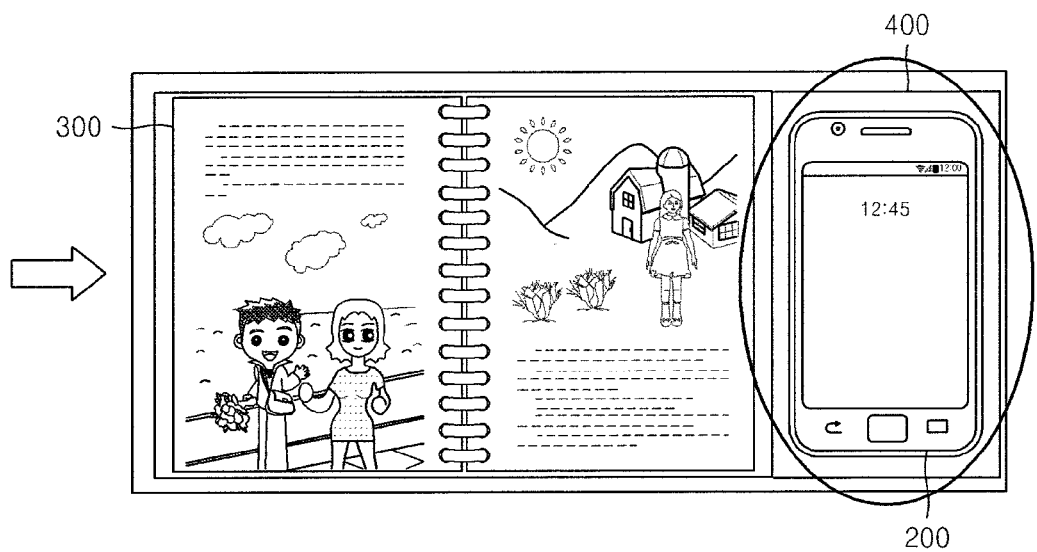

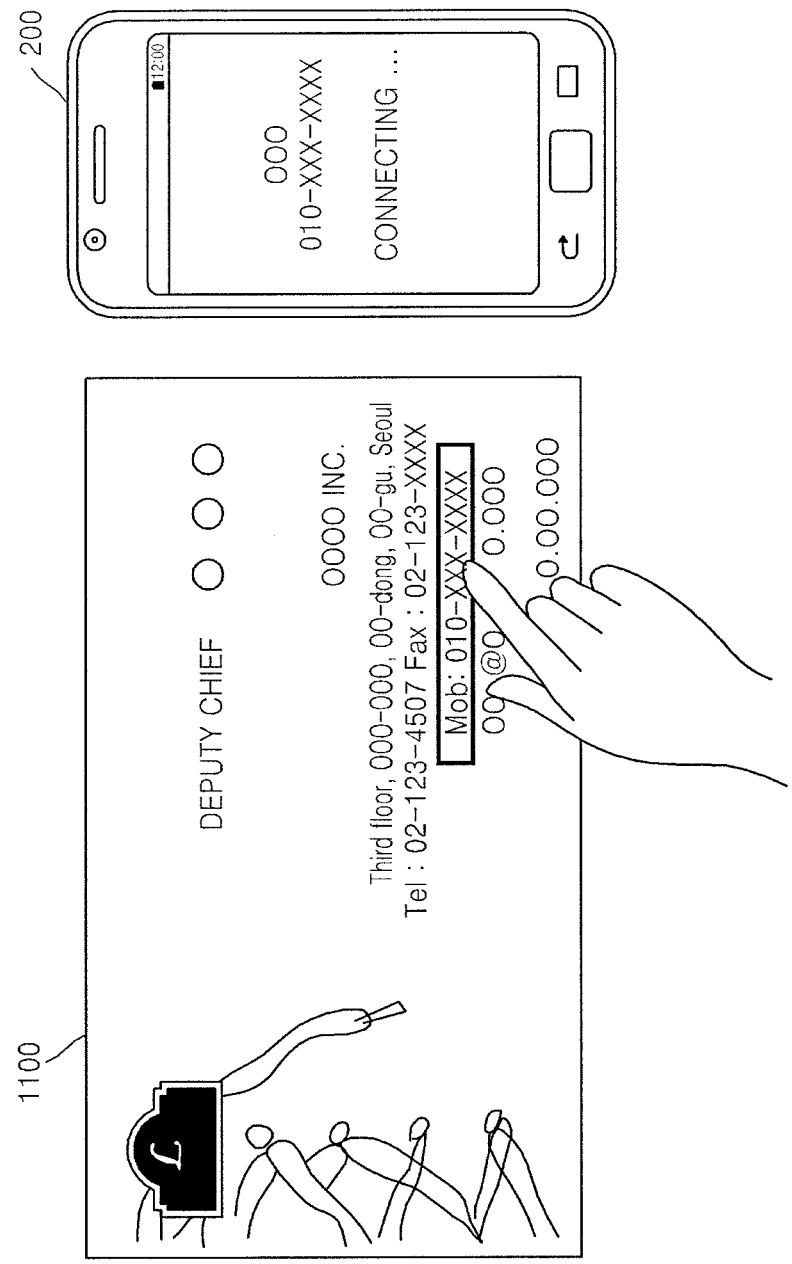

METHOD AND DEVICE FOR PROVIDING INFORMATION REGARDING AN OBJECT

CROSS-REFERENCE TO RELATED APPLICATION(S)

This application claims the benefit under 35 U.S.C. §119(a) of a Korean patent application filed on Nov. 2, 2012 in the Korean Intellectual Property Office and assigned Serial No. 10-2012-0123753, the entire disclosure of which is hereby incorporated by reference.

TECHNICAL FIELD

The present disclosure relates to a method and device for providing information regarding an object. More particularly, the present disclosure relates to a method and device for providing information regarding an object by sensing a user's gesture regarding the object, and according to the user's gesture that is sensed, providing information regarding the object via a pre-determined device.

BACKGROUND

With miniaturization of computers and the development of a network among devices, a ubiquitous computing environment has been established in recent times. In a near future, periphery objects within a home or an office will have a computer installed in them, contributing to enriching human life. A change like this may cause a need for direct interactions with general objects (particularly, such as papers or books), which previously were incapable of being linked to a digital system.

Currently, when a user tries to store information written on papers in a mobile device, it is required for the user to record the information written on the papers by driving a camera of the mobile device, and for the mobile device to store it by post-processing the recorded image. Or, the user needs to have a Personal Computer (PC) recognize the information written on the papers, for example by means of a scanner, and the PC needs to transmit the recognized information to the mobile device by post-processing it. Therefore, a system for providing direct and simple interactions between the general objects (particularly papers and books) and digital devices is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for providing information related to an object, wherein a first device senses a gesture related to the object, and according to the sensed gesture, a second device, which is connected with the first device in a network, provides users information regarding the object.

In accordance with an aspect of the present disclosure, a method of providing information related to an object, in a first device is provided. The method includes sensing a gesture related to the object located in a certain area via the first device, obtaining content related to the object according to the sensed gesture, and transmitting the obtained content to a second device that is connected with the first device in a network, wherein the content is output via the second device.

The method may further include capturing an image of the object, and, based on the captured image of the object, identifying the object.

The method may include searching for information related to the object from a memory or an external server, by using the captured image of the object as metadata.

The method may include recognizing a marker disposed in the object, and, based on the recognized marker, identifying the object.

The marker may include at least one of a one-dimensional barcode, a two-dimensional barcode, a three-dimensional barcode, and a color code.

The method may include sensing the gesture by using an image input device.

The method may include sensing the gesture that is selecting all or a part of an area of the object.

The method may include capturing first content in all or the part of the area of the object that is selected via the gesture, and transmitting the first content to the second device.

The method may include capturing first content in all or the part of the area of the object that is selected, extracting second content corresponding to the first content, and transmitting the second content that is extracted to the second device.

The method may include sensing the gesture of touching at least one image of a plurality of images included in the object and dragging the at least one image to a location of the second device and transmitting the at least one image that is touched to the second device.

The method may include sensing the gesture of requesting a translation of a text into a certain language, obtaining the content that is a translation of the text into the certain language, and transmitting the translation content to the second device.

The method may further include sensing a gesture for selecting connection identification information of an external device in the object, and transmitting a control command to the second device for requesting a connection to the external device, based on the connection identification information.

The connection identification information may include at least one of a telephone number, an email address, a Social Networking Service (SNS) address, and a website address.

The method may further include recognizing the second device, and establishing a network connection with the recognized second device.

In accordance with another aspect of the present disclosure, a first device for providing information related to an object is provided. The first device includes a sensing unit configured to sense a gesture related to the object located in a certain area, a control unit configured to obtain content related to the object according to the sensed gesture, and a communication unit configured to transmit the obtained content to the second device that is connected with the first device in a network.

The control unit of the first device may capture an image of the object via an image input device and may identify the object based on the captured image of the object.

The control unit of the first device may search for information related to the object from a memory or an external server using the captured image of the object as metadata.

The sensing unit of the first device may recognize a marker disposed in the object, and the control unit of the first device may identify the object based on the recognized marker.

The sensing unit of the first device may sense the gesture that is selecting all or a part of an area of the object.

The control unit of the first device may capture first content in all or the part of the area of the object that is selected and the communication unit of the first device may transmit the first content to the second device.

The control unit of the first device may capture first content in all or the part of the area of the object that is selected and extract second content associated with the first content. The communication unit of the first device may transmit the second content to the second device.

The sensing unit of the first device may sense the gesture of touching at least one image of a plurality of images included in the object, and dragging the at least one image to a location of the second device. The communication unit of the first device may transmit the at least one image to the second device.

The sensing unit of the first device may sense the gesture of requesting a translation of a text into a certain language. The control unit of the first device may obtain the content that is a translation of the text into the certain language and the communication unit of the first device may transmit the translation content to the second device.

The sensing unit of the first device may sense the gesture of selecting connection identification information of an external device in the object. The communication unit of the first device may transmit a control command to the second device for requesting a connection to the external device, to the second device, based on the connection identification information.

The sensing unit of the first device may recognize the second device, and, the control unit of the first device may establish a network with the second device that is recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A and 4B are views illustrating a method in which a first device recognizes a second device according to an embodiment of the present disclosure;

FIG. 11 is a view illustrating a screen showing a second device requesting a phone connection to an external device when a first device senses a user's gesture of selecting a cellular phone number in a name card according to an embodiment of the present disclosure.

Throughout the drawings, it should be noted that like reference numbers are used to depict the same or similar elements, features, and structures.

DETAILED DESCRIPTION

Figure 1A:
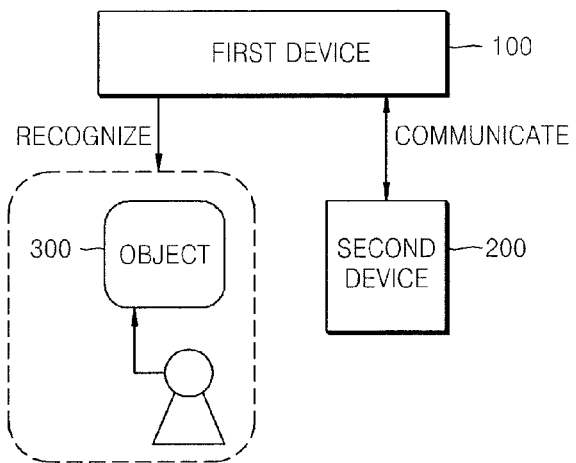
FIGS. 1A and 1B are views illustrating an information providing system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

All terms (including technical and scientific terms) used herein have the same meaning as commonly understood by one of ordinary skill in the art to which various embodiments belong. Further, the meaning of terms or words used in the specification and the claims should not be limited to the literal or commonly employed sense, but should be construed in accordance with the spirit of the disclosure to most properly describe the present disclosure.

The terminology used herein is for the purpose of describing particular various embodiments only and is not intended to be limiting of various embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. Also, Expressions such as "at least one of," when preceding a list of elements, modify the entire list of elements and do not modify the individual elements of the list.

Throughout the specification, an "object" refers to a general object that does not include a communication module, that is, an object that is incapable of a wired and wireless communication with an external device. For example, an object according to an embodiment of the present disclosure may include an analogue paper, a book, an album, a document, a photo, a picture, a cup, a mirror, a wallet, and a paper calendar that does not include digital functions, but it is not limited thereto.

The present disclosure will now be described more fully with reference to the accompanying drawings, in which various embodiments of the present disclosure are shown. The present disclosure may, however, be embodied in many different forms and should not be construed as being limited to the various embodiments set forth herein, rather, these various embodiments are provided so that this disclosure will be thorough and complete, and will fully convey the present disclosure. Furthermore, a detailed description of other parts will not be provided not to make the present disclosure unclear. Like reference numerals in the drawings refer to like elements throughout.

Figure 1B:
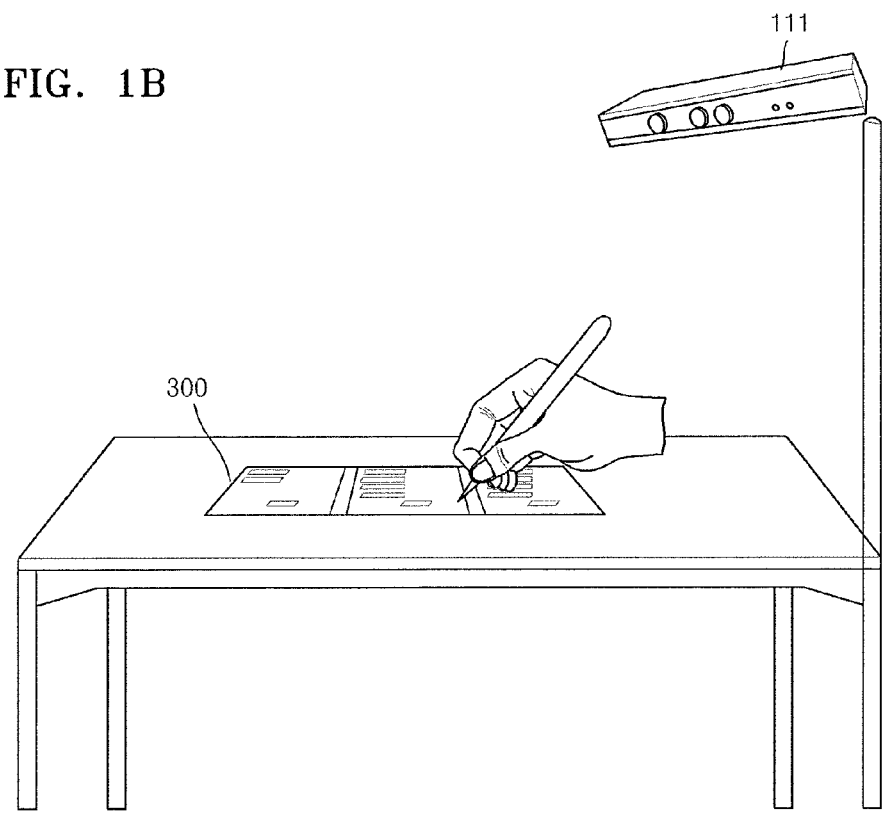

FIGS. 1A and 1B are views illustrating an information providing system according to an embodiment of the present disclosure.

Referring to FIG. 1A, the information providing system according to an embodiment of the present disclosure may include a first device 100, a second device 200, and an object 300. However, not all of the illustrated components are essential components. The information providing system may be embodied by including more components than the illustrated, and fewer components than the illustrated. For example, the information providing system may further include an external server to connect the first device 100 and the second device 200.

The first device 100 may be connected to the second device 200 by a wire or wirelessly. Particularly, according to an embodiment of the present disclosure, the first device 100 may be connected to the second device 200 by a short-range wireless communication. Examples of the short-range wireless communication may include Wireless Fidelity (Wi-Fi), Near Field Communication (NFC), BLUETOOTH®, ZIG-BEE®, Wi-Fi Direct (WFD), and Ultra Wideband (UWB), but it is not limited thereto.

The first device 100 may recognize the object 300 and distinguish the object 300 from other objects. Also, the first device 100 may sense a user's gesture regarding the object 300. Descriptions of these aspects will now be made in reference to FIG. 1B.

Referring to FIG. 1B, the first device 100 may sense the user's gesture regarding the object 300 via an image input device 111. The image input device 111 may be a 2-Dimensional (2D) camera or a 3-Dimensional (3D) camera. Also, examples of the image input device 111 may include a depth camera and a multi-view camera. The user's gesture according to an embodiment of the present disclosure may include a tapping, a touching and holding, a double tapping, a dragging, a flicking, a dragging and dropping, and a pinching.

"A tapping" is a movement whereby a user touches an object by using a finger or a touching instrument (for example, an electronic pen), and, without moving, immediately lifts the finger or the touching instrument from the object. "A double tapping" is a movement whereby a user touches the object twice by using a finger or a stylus.

"A touching and holding" is a movement whereby a user touches the object by using a finger or a touching instrument (for example, an electronic pen), and maintains the touching input for more than a particular time (for example, 2 seconds). In other words, "a touching and holding" refers to a case when a time difference between a point of touching-in and a point of touching-out is more than the particular time (for example, 2 seconds). To have the user recognize whether the touching input is a tapping or a touching and holding, if the touching input is maintained for more than the particular time, a visual or auditory signal may be provided. The particular time may vary according to various embodiments of the present disclosure.

"A dragging" is a movement whereby a user touches the object by a finger or a touching instrument, and maintaining the touching movement, moves the finger or the touching instrument to other directions within the object.

"A flicking" is a movement whereby a user drags the object by using a finger or a touching instrument at a rate that is the same or higher than a particular speed (for example, 100 pixel/s). "A dragging and dropping" is a movement whereby a user drags the object to a certain place by using a finger or a touching instrument, and leaves the object there.

"A pinching" is a movement whereby a user touches on a screen with two fingers, whereby the two fingers move in different directions.

The second device 200 may receive content regarding the object 300 from the first device 100 that is connected with the second device 200 in a network. Also, the second device 200 may output the content that is received from the first device 100 on a screen. That is, the second device 200 according to an embodiment of the present disclosure may include a communication unit, an output unit (for example, a display unit, a sound output unit, and a vibration motor), a control unit, a memory, and a user input unit.

The second device 200 may be formed in various forms. For example, the second device 200 may include a cellular phone, a smart phone, a laptop computer, a tablet Personal Computer (PC), an electronic book terminal, a digital broadcasting terminal, a Personal Digital Assistant (PDA), a Portable Multimedia Player (PMP), a navigation device, an MP3 player, and a digital camera, but it is not limited thereto.

Hereinafter, a method in which the first device 100 and the second device 200 provide users information regarding the object 300, according to the user's gesture, will be described in detail, in reference to FIG. 2.

Figure 2:
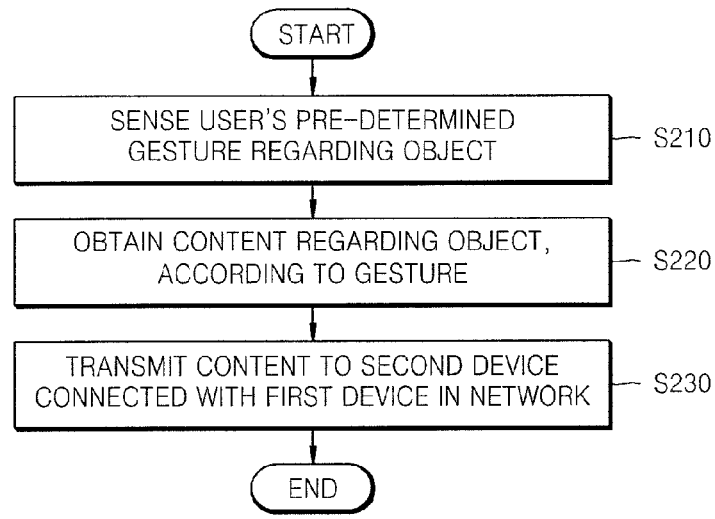
FIG. 2 is a flowchart illustrating a method of providing information regarding an object according to an embodiment of the present disclosure.

FIG. 2 is a flowchart illustrating a method of providing information regarding an object according to an embodiment of the present disclosure.

Referring to FIG. 2, in operation S210, the first device 100 may sense a user's pre-determined gesture regarding object 300 located in a certain area. The certain area is an area within which the first device 100 may sense the object 300 or the user's gesture regarding the object 300. For example, the certain area may be an area in which the image input device 111 of the first device 100 may obtain an image regarding the object 300 (i.e. an area that the image input device 111 may record).

The first device 100 may sense the user's pre-determined gesture by using the image input device 111 (for example, a depth camera). The pre-determined gesture may include a gesture selecting all or a part of an area of the object 300, a gesture requesting a capturing of the selected area, a gesture requesting a search of the selected area, a gesture requesting a translation of the selected area, and a gesture requesting a connection of a phone call, for example.

Meanwhile, the first device 100 according to another embodiment of the present disclosure may sense the user's pre-determined gesture by an electronic pen. For example, if the user selects a certain area by drawing a line on a paper on which a specific pattern is printed, via the electronic pen, the electronic pen may transmit coordinates information regarding the certain area that the user selected, to the first device 100. In this case, the first device 100 may identify the area that is selected by the user, based on the coordinate information that is received from the electronic pen.

According to yet another embodiment of the present disclosure, the first device 100 may recognize a user's sound gesture regarding the object 300 via a sound input device (for example, a microphone).

In operation S220, the first device 100 may obtain content regarding the object 300 according to the user's pre-determined gesture. According to an embodiment of the present disclosure, the content may include at least one of an image and a text.

The first device 100 according to an embodiment of the present disclosure may directly generate the content regarding the object 300, or extract the content from the outside or a memory. For example, the first device 100 may capture first content in all or a part of an area the object 300, which is selected according to the user's pre-determined gesture, and generate video content regarding the object 300. Also, the first device 100 may extract (or search) second content (for example, the original content) corresponding to the first content, from a web server or the memory, by using the first content that is captured as metadata.

In operation 5230, the first device 100 may transmit the content regarding the object 300 to the second device 200 that is connected with the first device 100 in a network. The first device 100 may transmit the content regarding the object 300 to the second device 200 via the short-range wireless communication (for example, Wi-Fi, BLUETOOTH®, and so forth). Here, the content regarding the object 300 may be output in the second device 200. The second device 200 may output the content regarding the object 300, by using at least one of a video signal, an audio signal, and a vibration signal.

Therefore, the first device 100 according to an embodiment of the present disclosure may sense the user's gesture regarding an object 300 and provide the content corresponding to the user's gesture for the second device 200, thereby providing users with an experience as if the object 300 that is an analogue device is connected to the second device 200 that is a digital device.

Hereinafter, a method in which the first device provides information regarding the object 300 by sensing the user's gesture will be described more in detail, in reference to FIG. 3.

Figure 3:
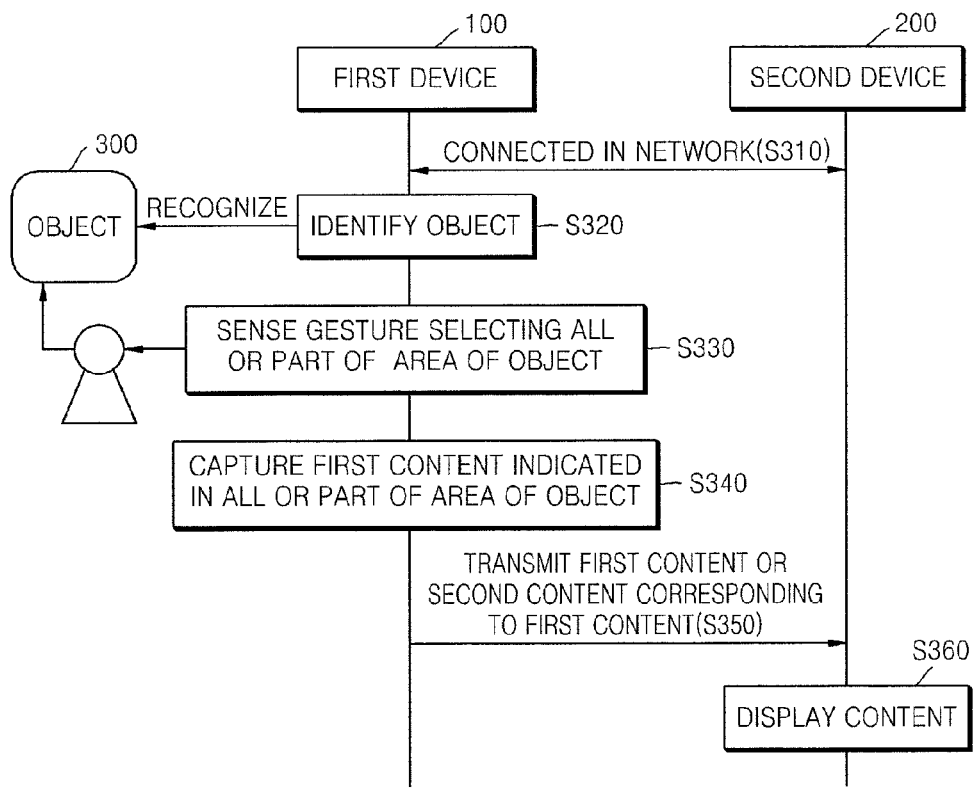
FIG. 3 is a flow diagram illustrating a method of providing information regarding an object based on a user's gesture according to an embodiment of the present disclosure.

FIG. 3 is a flow diagram illustrating a method of providing information regarding an object based on a user's gesture according to an embodiment of the present disclosure.

Referring to FIG. 3, in operation S310, the first device 100 and the second device 200 may be connected in a network. The first device 100 may request the second device 200 for a connection, or the first device 100 may receive the connection request from the second device 200.

For example, according to an embodiment of the present disclosure, the first device 100 may recognize a marker of the second device 200 located in a pre-determined position. The marker of the second device 200 includes identification information of the second device 200. The marker of the second device 200 may include barcodes (a one-dimensional barcode, a two-dimensional barcode, and a three-dimensional barcode), a color code, and a BLUETOOTH® Low Energy (BLE) tag. The BLE tag may broadcast the identification information to the outside by a BLE communication.

The first device 100 may identify the second device 200, based on the marker of the second device 200 and then extract connection information of the second device 200 corresponding to the identification information of the second device 200. Also, the first device 100 may request a connection to the second device 200 according to the connection information of the second device 200.

The connection information of the second device 200 may include a communication method of the second device 200, connection information (e.g., Service Set Identifier (SSID), an Internet Protocol (IP) address, a Media Access Control (MAC) address, a channel number, a security key, and so forth) of a wireless Local Area Network (LAN) that is used by the second device 200, a MAC address of the second device 200, a Bluetooth address of the second device 200, a product name of the second device 200, and a profile of the second device 200. The communication method may include a wireless LAN (an ad-hoc mode or an infrastructure mode), BLUETOOTH®, ZIGBEE®, a WFD, and an UWB.

According to another embodiment of the present disclosure, if the user places the second device 200 in a predetermined position, the second device 200 may receive information for connecting with the first device from the NFC tag located in a certain area. Here, the second device 200 may request the first device 100 for a communication connection. The first device 100, based on the connection request received from the second device 200, may connect the communication with the second device 200. The aspect as such will be described in detail below with reference to FIGS. 4A and 4B.

In operation S320, the first device 100 may identify the object 300 located in a certain area.

The first device 100 may capture an image of the object 300 via the image input device 111. The first device 100 may identify the object 300, based on the captured image of the object 300. In other words, the first device 100 may search for information regarding the object 300 from the memory or the external server by using the captured image of the object 300 as metadata. For example, when the object 300 is a book, the first device 100 may capture a title, a cover, a character image of the book, and search for the object 300 from the memory or the external server by using the captured image. Here, the first device 100 may identify the object 300 based on the search result, and obtain detailed information (for example, a title of the book, a published year, a publisher, and an author) regarding the object 300.

According to another embodiment of the present disclosure, the first device 100 may identify the object 300 by using a marker included in the object 300. The marker included in the object 300 may include identification information of the object 300. The marker included in the object 300 may include a one-dimensional barcode, a two-dimensional barcode (for example, a quick response code), a three-dimensional barcode, a grey code, a color code, and a BLE tag.

When the marker included in the object 300 is a barcode or a color code, the first device 100 may recognize the marker by using the image input device 111. Also, when the marker included in the object 300 is a BLE tag, the first device 100 may receive the identification information of the object 300, which is broadcasted by the BLE tag.

In operation S330, the first device 100 may sense the user's pre-determined gesture that is selecting all or a part of an area of the object 300. According to an embodiment of the present disclosure, the first device 100 may sense the user's pre-determined gesture by using the image input device 111. According to another embodiment of the present disclosure, the first device 100 may sense the user's pre-determined gesture by using the electronic pen. Meanwhile, according to an embodiment of the present disclosure, the first device 100 may display an identification of all or the part of the area that the user selected, by using, for example, a projector.

In operation S340, the first device 100 may capture first content in all or the part of the area of the object 300. Further explanation regarding operations S330 to S340 are provided with reference operations S210 to S220 of FIG. 2, and thus will be omitted.

In operation 5350, the first device 100 may transmit the first content, or second content that corresponds to the first content.

That is, the first device 100 may transmit the first content itself, which captured all or the part of the area of the object 300, which is selected by the user to the second device 200. Or, the first device 100 may extract the second content from the first content, and transmit the second content to the second device 200.

In operation 5360, the second device 200 may display the first content or the second content. Thus, the user may receive a response of the predetermined gesture regarding the object 300 via the second device 200.

Figure 4B:
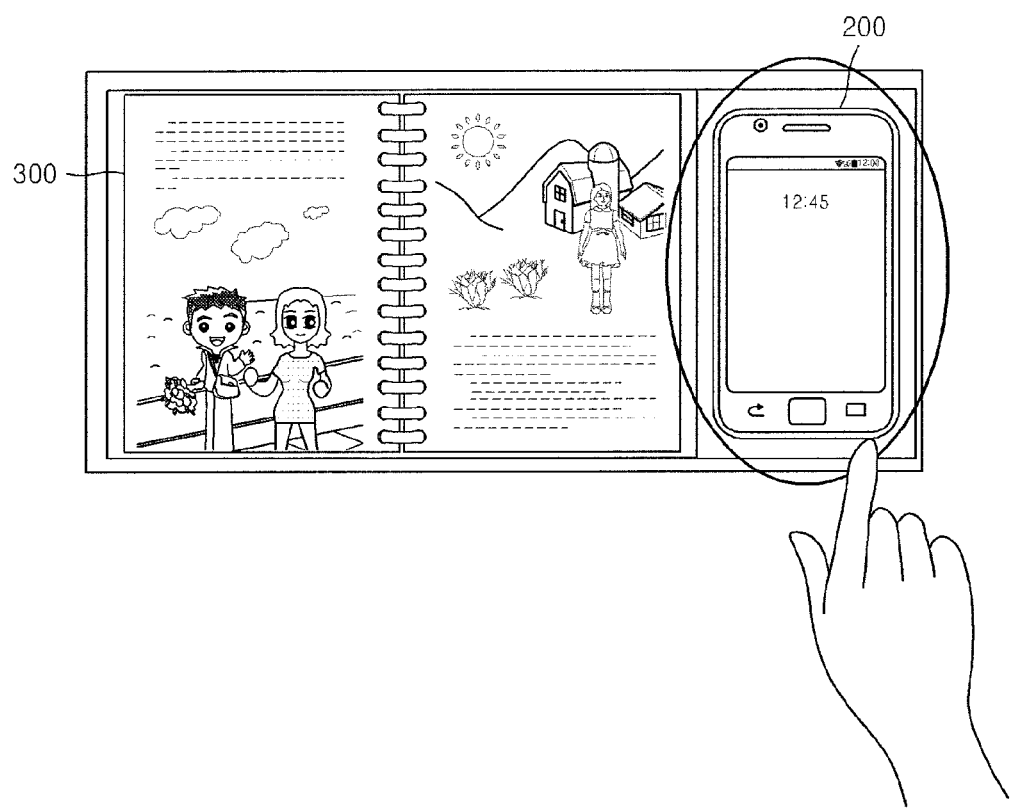

FIGS. 4A and 4B are views illustrating a method in which a first device recognizes a second device according to an embodiment of the present disclosure.

According to an embodiment of the present disclosure, there may be a plurality of devices in proximity to the object 300, thus, the first device 100 may have to specify the second device 200 of the plurality of devices, which could be connected with the object 300.

As illustrated in FIG. 4A, if the user places the second device 200 in a predetermined position 400, the second device 200 may receive data from the NFC tag existing in the predetermined position 400. For example, the second device 200 may receive identification information (for example, an ID) of the NFC tag, or connection information (for example, identification information of the second device 200, information of a wireless LAN that is used by the second device 200, and a BLUETOOTH® address of the second device 200) for connecting with the second device 200 from the NFC tag. The second device 200, based on the received data, may request a connection to the first device 100. Here, the first device 100 may specify the second device 200, which requested the connection, as a device connected with the object 300.

As illustrated in FIG. 4B, the first device 100 may sense the user's pre-determined gesture regarding the second device 200 and specify the second device 200 out of at least one device. The first device 100 may sense the user's pre-determined gesture via the image input device 111. For example, the first device 100 may specify a device that is touched by the user for more than the predetermined time (for example, 10 seconds or more) as the second device 200.

Figure 5A:
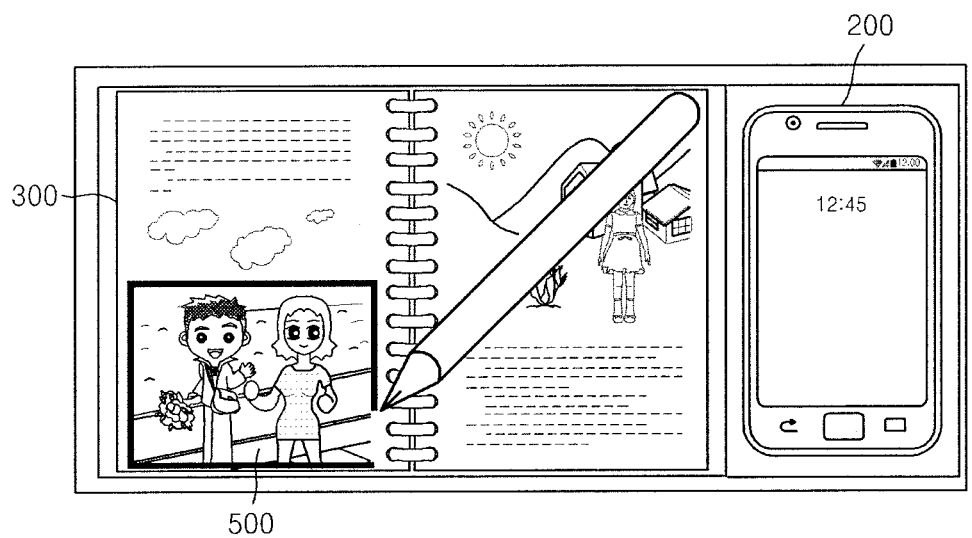
FIGS. 5A and 5B are views illustrating a screen on which a second device displays content corresponding to a certain predetermined area of an object, which is selected by a user according to an embodiment of the present disclosure.
Figure 5B:
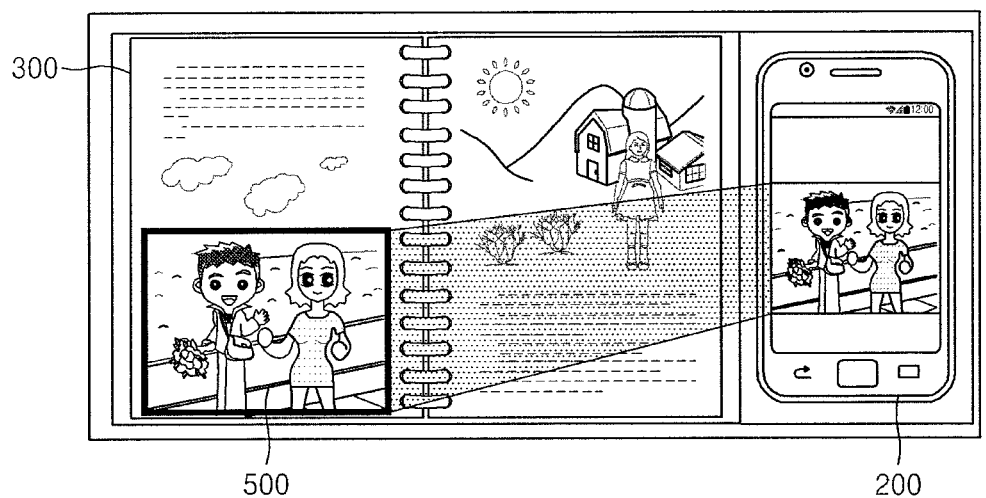

FIGS. 5A and 5B are views illustrating a screen on which a second device displays content corresponding to a certain predetermined area of an object, which is selected by a user according to an embodiment of the present disclosure.

Referring to FIG. 5A, the first device 100 may sense the user's gesture selecting a part of an area of the object 300. For example, the first device 100 may sense the user's gesture selecting a part of an area 500 of the object 300 by drawing a line by fingers or a pen.

Referring to FIG. 5B, the first device 100 may capture an image in the part of an area 500 selected by the user. In addition, the first device 100 may transmit the captured image itself to the second device 200 so that the second device 200 may display the captured image.

Also, the first device 100 may obtain the original image corresponding to the captured image and transmit the original image to the second device 200. For example, if the object 300 is a book, the first device 100 may obtain data regarding the original book from the memory or the external server, and extract the original image corresponding to the image captured from the original book. Also, the first device 100 may transmit the original image to the second device 200 so that the second device 200 may display the original image.

That is, the first device 100 according to an embodiment of the present disclosure may selectively transmit the captured image and the original image to the second device 200. For example, if the original data regarding the object 300 cannot be obtained, the first device 100 may capture first content itself in the part of an area of the object, which is selected by the user, and transmit the first content to the second device 200. If the original data regarding the object 300 can be obtained, the first device 100 may extract second content corresponding to the first content and transmit the second content to the second device 200.

The first device 100 may let the user easily capture and transmit an image in a part of an area of a book to the second device 200 by a simple gesture selecting the part of an area of the book.

Figure 6A:
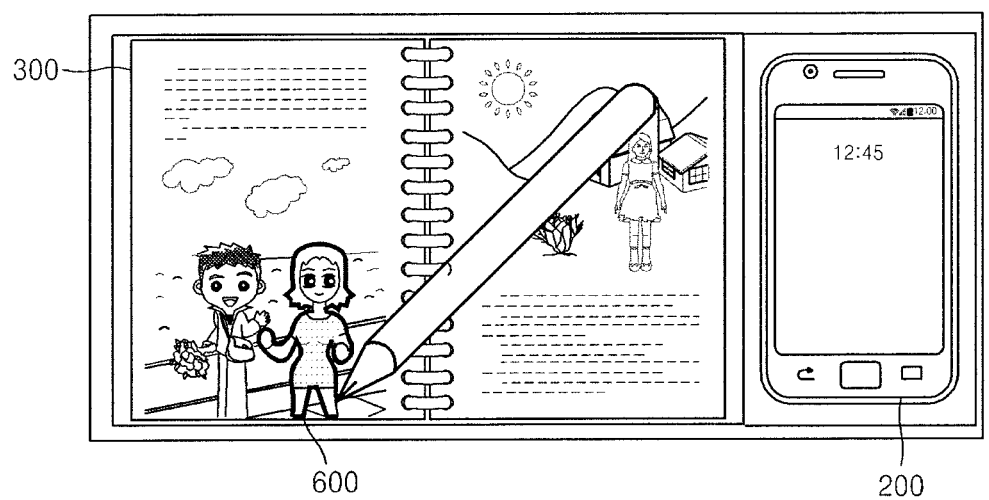
FIGS. 6A and 6B are views illustrating a screen on which a second device displays a certain image of an object, which is selected by a user according to an embodiment of the present disclosure.
Figure 6B:
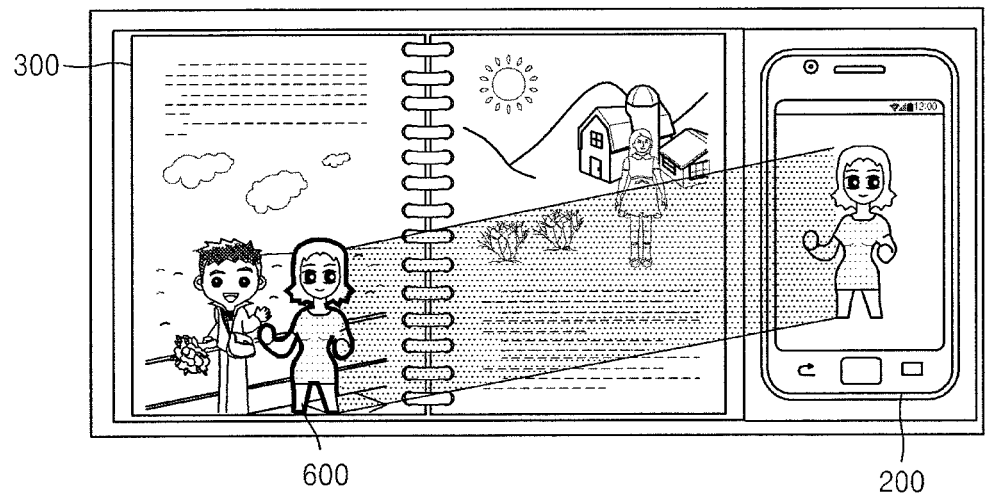

FIGS. 6A and 6B are views illustrating a screen on which a second device displays a certain image of an object, which is selected by a user according to an embodiment of the present disclosure.

Referring to FIG. 6A, the first device 100 may sense the user's gesture selecting a certain image 600 in the object 300. For example, the first device 100 may sense the user's gesture drawing a line along an outline of the image 600 by fingers or a pen. If the user draws the line along the outline of the image 600 by an electronic pen, the first device 100 may receive information regarding the image (or coordinates) selected by the user from the electronic pen.

Referring to FIG. 6B, the first device 100 may capture the certain image 600 selected by the user. In addition, the first device 100 may transmit the captured image 600 to the second device 200 so that the second device 200 may display the captured image 600.

In addition, the first device 100 may obtain the original image corresponding to the captured image 600, and transmit the original image to the second device 200. For example, the first device 100 may search for the original image corresponding to the captured image 600 from the web server or the memory, by using the captured image 600 or an image of the object 300 as metadata. Here, the second device 200 may display the original image corresponding to the image 600 selected by the user.

Figure 7A:
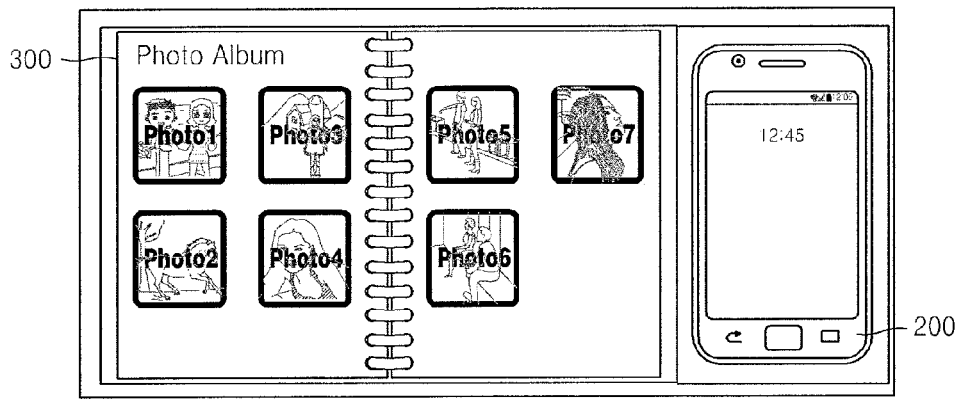
FIGS. 7A, 7B, and 7C are views illustrating a gesture selecting at least one image of a plurality of images in an object according to an embodiment of the present disclosure.
Figure 7B:
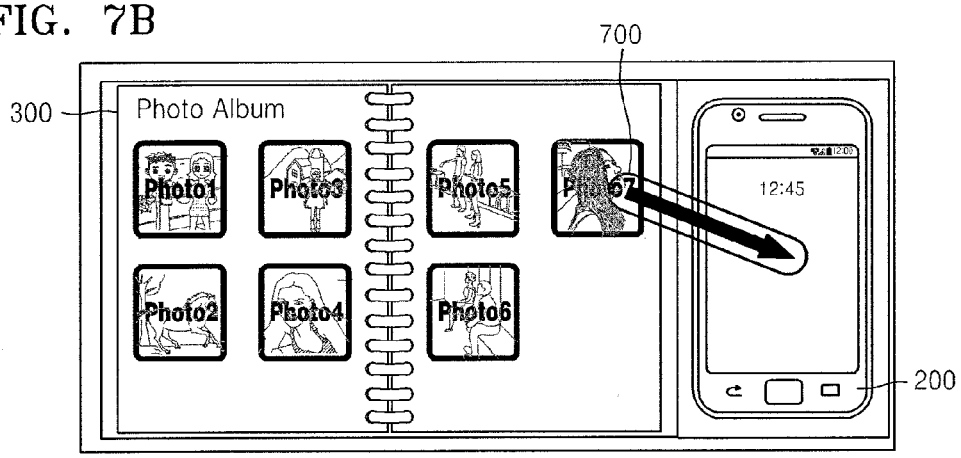
Figure 7C:
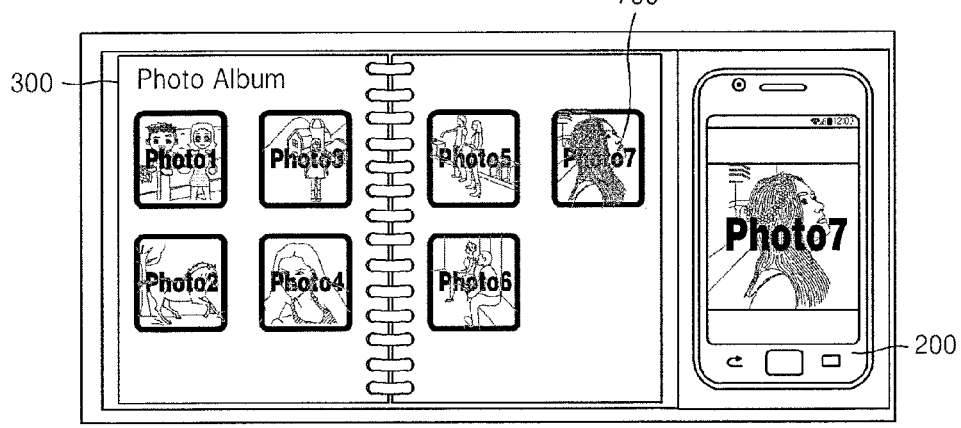

FIGS. 7A, 7B, and 7C are views illustrating a gesture selecting at least one image of a plurality of images in an object according to an embodiment of the present disclosure.

Referring to FIG. 7A, a photo album corresponding to the object 300 is displayed with a plurality of pictures is.

Referring to FIG. 7B, when the user wishes to move photo 700 to the second device 200, the user may touch the photo 700 and drag the photo 700 to the place where the second the device 200 is located. In this case, the first device 100, via the image input device 111, may sense the user's gesture touching at least one image (i.e., photo 700) and dragging the at least one image to the place where the second device 200 is located.

In this case, as illustrated in FIG. 7C, the first device 100 may capture the photo 700 selected by the user, and transmit the captured image of the photo 700 to the second device 200. Also, the first device 100 may extract the original image of the photo 700 selected by the user and transmit the original image of the photo 700 to the second device 200. Here, the second device 200 may display the captured image of the photo 700 received from the first device 100 or the original image corresponding to the photo 700.

Therefore, according to an embodiment of the present disclosure, the user may easily move the photo 700 of the photo album to the second device 200 by a simple gesture referred to as "a touching and dragging," or "a dragging and dropping," without performing inconvenient manipulations, such as scanning the photo 700 by using a scanner or capturing the photo 700 by using a camera of the second device 200. In other words, the first device converts an analogue image of the photo to a digital image according to the user's pre-determined gesture.

Figure 8:
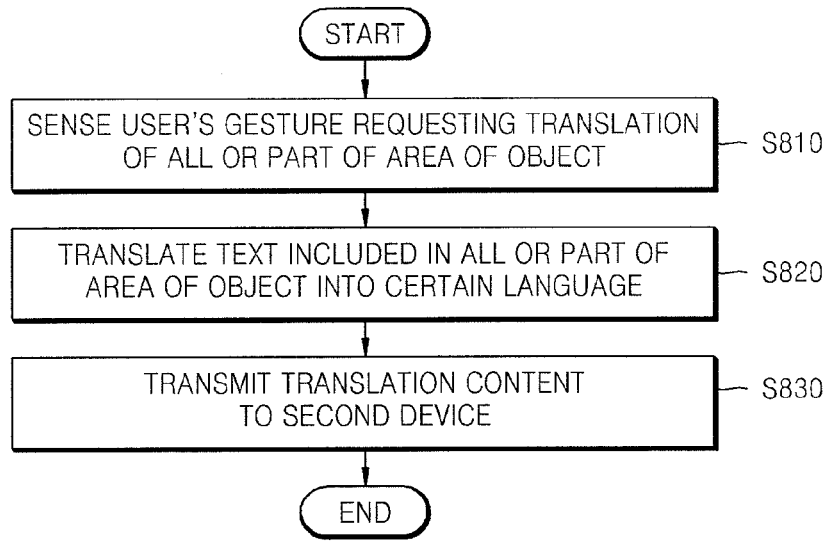
FIG. 8 is a flowchart illustrating a method of translating text into a certain language when the text is located in a certain area of an object according to an embodiment of the present disclosure.

FIG. 8 is a flowchart illustrating a method of translating text into a certain language when the text is located in a certain area of an object according to an embodiment of the present disclosure.

In operation S810, the first device 100 may sense the user's gesture requesting a translation of all or a part of an area of the object 300. According to an embodiment of the present disclosure, the gesture selecting a text in all or the part of the area of the object 300 and the gesture requesting a translation, may be one gesture, or may be separate gestures. For example, if the user selects the text in the object 300 by drawing a closing figure (i.e. a circle, a square, and a triangle), the first device 100 may sense the gesture drawing the closing figure as the gesture requesting a translation. In addition, if the user selects the text in the object 300 by drawing the closing figure (i.e. a circle, a squire, and a triangle), and then, draws "T" on the closing figure, the first device 100 may sense the gesture drawing "T" as the gesture requesting a translation.

Meanwhile, the gesture requesting a translation may vary according to various configurations. For example, a gesture sweeping two times from side to side may be regarded as the gesture requesting a translation, and a gesture drawing "T" may be regarded as the gesture requesting a translation. Thus, the gesture requesting a translation is not limited to the various embodiments described in this specification.

According to an embodiment of the present disclosure, the first device 100 may recognize the text in an area selected by the user via an image processing method. Also, the first device 100 may extract text information corresponding to the area selected by the user from the original data from the object 300.

In operation S820, the first device 100 may obtain the content that is a translation of the text into a certain language, the text included in all or the part of the area of the object 300.

According to an embodiment of the present disclosure, if the first device 100 senses the user's gesture requesting a translation, the first device 100 may perform the translation of the text that is selected. Also, the first device 100 may request the external server for the translation of the text that is selected, and receive the translation content from the external server.

The first device 100 may select the language to translate into according to the user's pre-determined gesture. For example, if the user selects the text and draws "E", the first device 100 may translate the selected text into English, and if the user selects the text and draws "J", the first device may translate the text into Japanese.

In operation S830, the first device 100 may transmit the translation content to the second device 200. The second device 200 may display the translation content on the screen. Hereinafter, more detailed descriptions will be made, in reference to FIG. 9.

Figure 9:
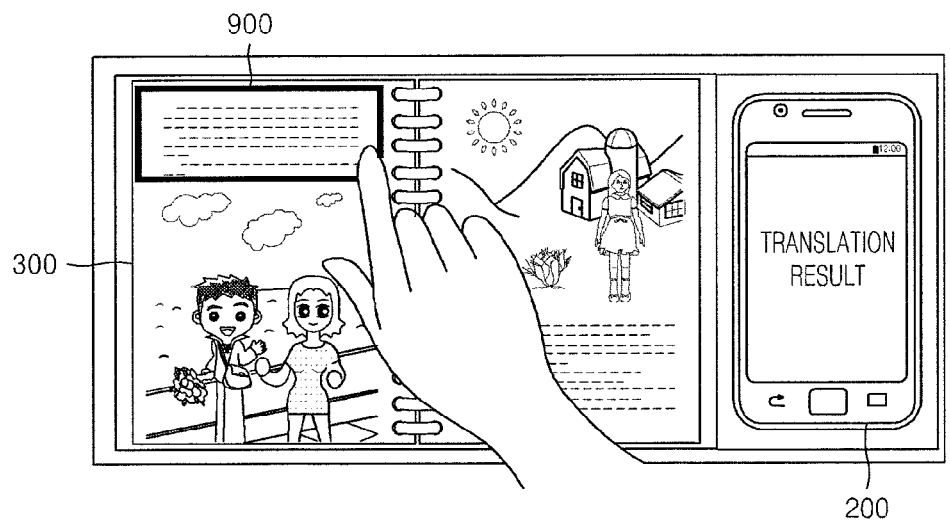
FIG. 9 is a screen of a second device that displays the text translated from a certain area of an object according to an embodiment of the present disclosure.

FIG. 9 is a screen of a second device that displays the text translated from a certain area of an object according to an embodiment of the present disclosure.

Referring to FIG. 9, the first device 100 may sense the user's gesture of selecting text 900 in the object 300 by drawing a closing figure. The first device 100 may sense the user's gesture requesting the translation of the text 900 into a certain language. In this case, the first device 100 may translate the text 900 into the certain language (for example, Korean) and transmit the translation content to the second device 200. Here, the second device 200 may display the translation content.

Therefore, when the user requests the translation by a simple gesture selecting a part of an analogue book, the user may immediately view the translation result via the second device 200.

Figure 10:
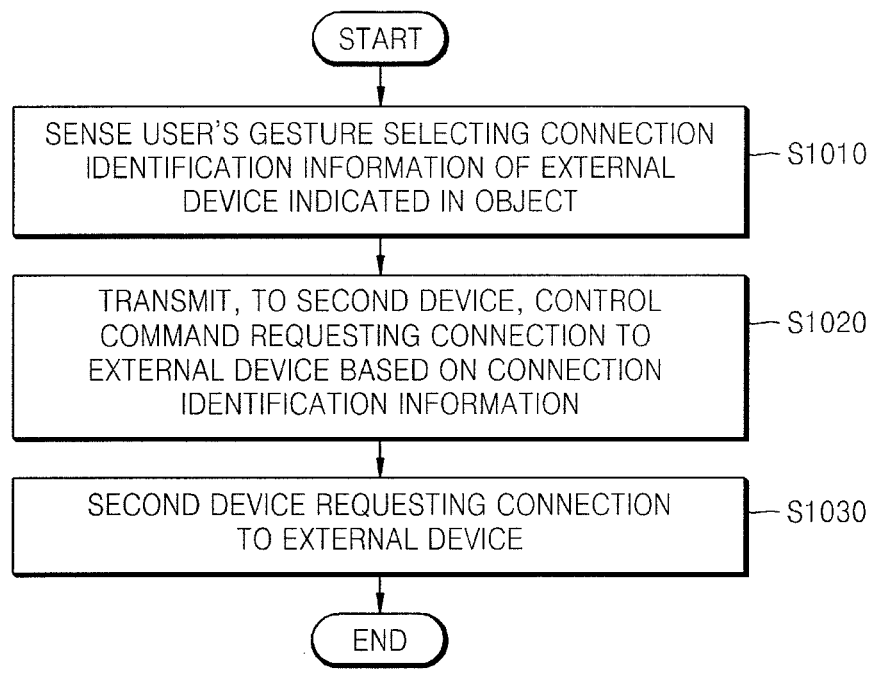
FIG. 10 is a flowchart illustrating a method in which a second device requests a connection to an external device when a first device senses a user's gesture selecting connection identification information of an external device according to an embodiment of the present disclosure.

FIG. 10 is a flowchart illustrating a method in which a second device requests a connection to an external device when a first device senses a user's gesture selecting connection identification information of an external device according to an embodiment of the present disclosure.

Referring to FIG. 10, in operation S1010, the first device 100 may sense the user's gesture selecting connection identification information of an external device in the object 300. Examples of the connection identification information may include a telephone number, an email address, a Social Networking Service (SNS) address, and a website address.

The connection identification information of the external device in the object 300 may be in a form of a number or a letter, or in a form of a barcode (for example, a QR code).

In operation S1020, the first device 100 may, based on the connection identification information, transmit a command requesting a connection to the external device to the second device 200.

According to an embodiment of the present disclosure, the first device 100 may recognize the connection identification information of the external device that is selected by the user via the image processing method, or extract the connection identification information of the external device that is selected by the user from data regarding the object 300.

The first device 100 may transmit the connection identification information of the external device to the second device 200 to request the connection to the external device.

In operation S1030, the second device 200 may request the connection to the external device. For example, the second device 200 may request a telephone connection to the external device, send an email, or contact the SNS server that the user of the external device is using. Hereinafter, more detailed descriptions will be made, in reference to FIG. 11.

FIG. 11 is a view illustrating a screen showing a second device requesting a phone connection to an external device when a first device senses a user's gesture of selecting a cellular phone number in a name card according to an embodiment of the present disclosure.

Referring to FIG. 11, the user may touch an area of the name card 1100 where a cellular phone number is located. In this case, the first device 100 may sense the user's gesture selecting the area of the name card 1100. The first device 100 may recognize the cellular phone number (for example, 010-XXX-XXXX) which is selected by the user using an image processing technology. If the first device 100 stores data related to the name card 1100, the first device 100 may sense the area of the name card 1100 that was touched by the user and extract the cellular phone number (for example, 010-XXX-XXXX) from the stored data related to the name card 1100.

The first device 100 may transmit the cellular phone number (for example, 010-XXX-XXXX) to the second device 200 and control the second device 200 to connect the phone to the external device.

Therefore, according to an embodiment of the present disclosure, the user may automatically form a phone connection with the external device via the second device 200 by touching the phone number in the name card 1100.

Figure 12A:
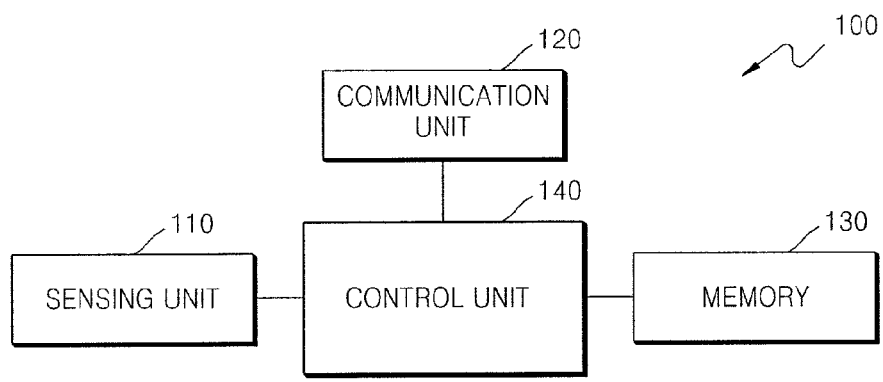
FIGS. 12A and 12B are block diagrams of a first device and a second device according to an embodiment of the present disclosure.
Figure 12B:
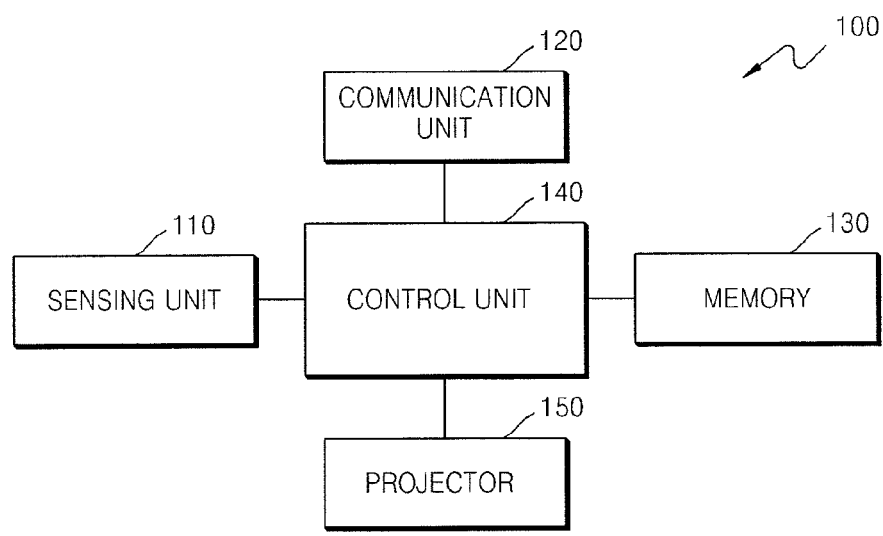

FIGS. 12A and 12B are block diagrams of a first device and a second device according to an embodiment of the present disclosure.

Referring to FIG. 12A, the first device 100 may include a sensing unit 110, a communication unit 120, a memory 130, and a control unit 140. However, not all of the illustrated components are essential components. The first device 100 may be embodied by including more components than illustrated, and fewer components than illustrated.

Hereinafter, the components will be described in order.

The sensing unit 110 may sense the user's pre-determined gesture regarding the object 300 located in a certain area. For example, the sensing unit 110 may sense the user's pre-determined gesture selecting all or a part of an area of the object 300. Also, the sensing unit 110 may sense the user's gesture touching at least one image of a plurality of images included in the object 300, and dragging the at least one image to a place where the second device 200 is located. The sensing unit 110 may sense the user's gesture requesting a translation of a text in the object 300 into a certain language. The sensing unit may sense the user's gesture in the object 300 selecting connection identification information of an external device.

The sensing unit 110 may include the image input device 111 and the sound input device (for example, a microphone). The image input device 111 according to an embodiment of the present disclosure may be a 2D camera, a 3D camera, a depth camera, or a multi-view camera. The depth camera may measure distance information of objects in a scene in real time, by using a Time-Of-Flight (TOF) technology.

Meanwhile, the first device 100 may include one or more than one image input devices 111. For example, the first device 100 may sense the user's pre-determined gesture and capture an area that is selected by the user by using one image input device (for example, a depth camera). Also, the first device 100 may sense the user's pre-determined gesture by using a first image input device (for example, a depth camera) and capture the area that is selected by the user by using a second image input device (for example, a 2D camera).

The sensing unit 110 may recognize a marker included in the object 300 or a marker included in the second device 200. The sensing unit 110 may, based on data received from an electronic pen, obtain information regarding an area of the object 300 that is selected by the user.

The communication unit 120 may include at least one component enabling communication between the first device 100 and the second device 200, and communication in a network in which the first device 100 and the second device 200 are located. For example, the communication unit 120 may include a wireless internet module, a wired internet module, and a short-range wireless communication module.

The wireless internet module refers to a module for a wireless internet connection, and the wireless internet module can be equipped inside and outside of the first device 100. The wired internet module refers to a module for a wired internet connection.

The short-range wireless communication module refers to a module for a short-range communication. The short-range wireless communication technology may include Wi-Fi, BLUETOOTH®, ZIGBEE®, a WFD, UWB, and an Infrared Data Association (IrDA), but it is not limited thereto.

The communication unit 120 may transmit content regarding the object 300 to the second device 200 connected with the first device 100 in a network. For example, the communication unit 120 may transmit content regarding all or a part of an area of the object 300 that is selected by the user.

Here, the communication unit 120 may transmit first content that captures all or the part of the area of the object 300, which is selected by the user, to the second device 200, and transmit second content associated with the first content, to the second device 200.

The communication unit 120 may transmit the content that is a translation of a text into a certain language, the text located in an area that is selected by the user, to the second device 200. In addition, the communication unit 120 may, based on connection identification information of the object 300 that is selected by the user, transmit a control command to the second device 200 for requesting a connection to an external device.

A program for processing and controlling the memory 130 and the control unit 140 may be stored. The memory 130 may perform a function of storing data input and output. For example, the data input and output may include content (for example, a text, an image, a video, music, a document, a book, a name card, and translation content) regarding the object 300.

The memory 130 may include at least one storing medium such as a flash memory, a hard disc, a multimedia card, a card memory type (for example, a Secure Digital (SD) or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc. Also, the first device 100 may operate a web storage that performs a storage function on the internet.

The control unit 140 controls the overall operations of the first device 100. That is, the control unit 140 may control the sensing unit 110, the communication unit 120, and the memory 130.

The control unit 140 may capture an image of the object 300 via the image input device 111 and, based on the captured image of the object 300, identify the object 300. For example, the control unit 140 may search for information regarding the object 300 from the memory 130 or the external server using the captured image of the object 300 as metadata. The control unit 140 may identify the object 300 by recognizing the marker included in the object 300.

The control unit 140 may recognize the second device 200 located in a predetermined position, and establish a network with the second device 200.

The control unit 140 may obtain content regarding the object 300 according to the user's pre-determined gesture. For example, the control unit 140 may capture a text or an image in all or a part of an area of the object 300 that is selected by the user via the image input device 111 and obtain first content regarding the object 300. Also, the control unit 140 may extract the second content corresponding to the first content that is captured from the original data regarding the object 300.

Referring to FIG. 12B, the first device 100 according to another embodiment of the present disclosure may further include a projector 150 in addition to the sensing unit 110, the communication unit 120, the memory 130, and the control unit 140. The projector 150 may provide a feedback regarding the user's pre-determined gesture. For example, if the user selects all or a part of an area of the object 300, the projector 150 may display an identification regarding the area that is selected by the user.

The method of the present disclosure may be implemented as computer instructions which may be executed by various computer means, and recorded on a computer-readable recording medium. The computer-readable recording medium may include program commands, data files, data structures, or a combination thereof. Examples of the computer-readable medium include storage media such as magnetic media (e.g., hard discs, floppy discs, or magnetic tapes), optical media (e.g., Compact Disc-Read Only Memories (CD-ROMs), or Digital Versatile Discs (DVDs)), magneto-optical media (e.g., optical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

According to an embodiment of the present disclosure, a direct and simple interaction between a general object (for example, a paper or a book) and a digital device can be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing information related to an object, performed by a first device, the method comprising:
sensing, by a sensor of the first device, a gesture related to the object located in a certain area;
obtaining content related to the object according to the sensed gesture; and
transmitting the obtained content to a second device that is connected with the first device in a network, the transmitted content being related to the object which is located outside of the first device and the second device,
wherein the content is output by the second device, and
wherein the transmitting the obtained content to the second device comprises:
determining whether an original image corresponding to a captured image, which is obtained by capturing the object is obtained, the original image being obtained from an external server or a memory of the first device;
transmitting, to the second device, only the original image of the captured image when the original image is obtained; and
transmitting, to the second device, the captured image when the original image is not obtained.

2. The method of claim 1, further comprising:
identifying the object based on the captured image of the object.

3. The method of claim 2, wherein the identifying of the object comprises searching for information related to the object from one of a memory and an external server using the captured image of the object as metadata.

4. The method of claim 1, further comprising:
recognizing a marker disposed in the object; and
identifying the object based on the recognized marker.

5. The method of claim 1, wherein the sensing of the gesture comprises sensing the gesture by using an image input device.

6. The method of claim 1, wherein the sensing of the gesture comprises sensing the gesture that is selecting all or a part of an area of the object.

7. The method of claim 1,
wherein the sensing of the gesture comprises sensing the gesture of touching at least one image of a plurality of images included in the object and dragging the at least one image to a location of the second device, and
wherein the transmitting of the content comprises transmitting the at least one image to the second device.

8. The method of claim 1,
wherein the sensing of the gesture comprises sensing the gesture for requesting a translation of a text into a certain language,
wherein the obtaining of the content comprises obtaining the content that is the translation of the text into the certain language, and
wherein the transmitting of the content comprises transmitting the translated content to the second device.

9. The method of claim 1, further comprising:
sensing a gesture for selecting connection identification information of an external device in the object; and
transmitting a control command to the second device for requesting a connection to the external device based on the connection identification information of the external device.

10. The method of claim 9, wherein the connection identification information of the external device comprises at least one of a telephone number, an email address, a Social Networking Service (SNS) address, and a website address.

11. The method of claim 1, further comprising:
recognizing the second device; and
establishing a network connection with the recognized second device.

12. At least one non-transitory processor readable medium for storing a computer program of instructions configured to be readable by at least one processor for instructing the at least one processor to execute a computer process for performing the method as recited in claim 1.

13. A first device for providing information related to an object, the first device comprising:
- a sensor configured to sense a gesture related to the object located in a certain area;
- at least one processor configured to obtain content related to the object according to the sensed gesture; and
- a communication interface configured to transmit the obtained content to a second device that is connected with the first device in a network, the transmitted content being related to the object which is located outside of the first device and the second device,
- wherein the at least one processor is further configured to determine whether an original image corresponding to a captured image, which is obtained by capturing the object, is obtained,
- wherein the original image is obtained from an external server or a memory of the first device, and
- wherein the communication interface is further configured to transmit, to the second device, only the original image of the captured image when the original image is obtained, and transmit, to the second device, the captured image when the original image is not obtained.

14. The first device of claim 13, wherein the at least one processor is further configured to:
- identify the object based on the captured image of the object.

15. The first device of claim 14, wherein the at least one processor is further configured to search for information related to the object from one of a memory and an external server using the captured image of the object as metadata.

16. The first device of claim 13,
- wherein the sensor is further configured to recognize a marker disposed in the object, and
- wherein the at least one processor is further configured to identify the object based on the recognized marker.

17. The first device of claim 13,
- wherein the sensor is further configured to:
  - sense the gesture of touching at least one image of a plurality of images included in the object; and
  - drag the at least one image to a location of the second device, and
- wherein the communication interface is further configured to transmit the at least one image to the second device.

18. The first device of claim 13,
- wherein the sensor is further configured to sense the gesture of requesting a translation of a text into a certain language,
- wherein the at least one processor is further configured to obtain the content that is the translation of the text into the certain language, and
- wherein the communication interface is further configured to transmit the translated content to the second device.

19. The first device of claim 13,
- wherein the sensor is further configured to sense the gesture of selecting connection identification information of an external device in the object, and
- wherein the communication interface is further configured to transmit a control command to the second device for requesting a connection to the external device based on the connection identification information of the external device.

20. The first device of claim 13,
- wherein the sensor is further configured to recognize the second device, and
- wherein the at least one processor is further configured to establish a network connection with the second device that is recognized.

* * * * *